US012505197B2

(12) United States Patent
Van Nieuwenhuyze et al.

(10) Patent No.: US 12,505,197 B2
(45) Date of Patent: Dec. 23, 2025

(54) PROTECTION OF AN ELECTRONIC DEVICE

(71) Applicants: STMICROELECTRONICS (ROUSSET) SAS, Rousset (FR); STMICROELECTRONICS BELGIUM, Machelen (BE)

(72) Inventors: Olivier Van Nieuwenhuyze, Wezembeek-Oppem (BE); Alexandre Charles, Auriol (FR)

(73) Assignees: STMICROELECTRONICS (ROUSSET) SAS, Rousset (FR); STMICROELECTRONICS BELGIUM, Machelen (BE)

( * ) Notice: Subject to any disclaimer, the term of this patent is extended or adjusted under 35 U.S.C. 154(b) by 29 days.

(21) Appl. No.: 18/391,287

(22) Filed: Dec. 20, 2023

(65) Prior Publication Data

US 2024/0211579 A1   Jun. 27, 2024

(30) Foreign Application Priority Data

Dec. 22, 2022  (FR) ........................................ 2214230

(51) Int. Cl.
*G06F 21/44*   (2013.01)
(52) U.S. Cl.
CPC ................... *G06F 21/44* (2013.01)
(58) Field of Classification Search
CPC ......... G06F 21/44; G06F 21/74; G06F 21/575
See application file for complete search history.

(56) References Cited

U.S. PATENT DOCUMENTS

| | | | |
|---|---|---|---|
| 9,154,479 B1 | 10/2015 | Sethi | |
| 11,356,845 B1* | 6/2022 | Nelson | .................... G06F 21/44 |
| 2006/0015748 A1 | 1/2006 | Goto et al. | |
| 2007/0283327 A1 | 12/2007 | Mathew et al. | |
| 2010/0064142 A1 | 3/2010 | Matsuzaki | |
| 2013/0176980 A1 | 7/2013 | Kneckt et al. | |
| 2015/0150127 A1 | 5/2015 | Ning et al. | |
| 2016/0345376 A1 | 11/2016 | Yang et al. | |
| 2017/0195327 A1 | 7/2017 | Lee et al. | |
| 2019/0036688 A1 | 1/2019 | Wasily et al. | |
| 2019/0163910 A1 | 5/2019 | Moon et al. | |
| 2021/0011871 A1 | 1/2021 | Blanco et al. | |
| 2021/0042207 A1 | 2/2021 | Joyce et al. | |
| 2021/0058774 A1* | 2/2021 | Yang | ................... H04W 12/086 |
| 2022/0245253 A1* | 8/2022 | Van Nieuwenhuyze | ..................... G06F 21/575 |
| 2024/0211578 A1 | 6/2024 | Van Nieuwenhuyze et al. | |

FOREIGN PATENT DOCUMENTS

| | | |
|---|---|---|
| CN | 104318182 A | 1/2015 |
| WO | WO 2018162040 A1 | 9/2018 |

* cited by examiner

*Primary Examiner* — Brian Whipple
(74) *Attorney, Agent, or Firm* — Seed IP Law Group LLP (57) ABSTRACT

An electronic device includes a processor and one or more secure elements. The processor executes a first high-level operating system and a first application. The one or more secure elements execute a first low-level operating system to verify a reliability, an authenticity, or a reliability and an authenticity of the first high-level operating system, and execute a second low-level operating system to execute a second application and to perform wireless communication with the first application. At each booting of the electronic device, the first low-level operating system performs a verification of the reliability, of the authenticity, or of the reliability and the authenticity of the first high-level operating system. In response to a request from the first application to the second application, the second low-level operating system requests a result of the verification from the first low-level operating system, and transmits the result to the second application.

27 Claims, 5 Drawing Sheets

PROTECTION OF AN ELECTRONIC DEVICE

BACKGROUND

Technical Field

The present disclosure generally concerns electronic devices, and more particularly electronic devices adapted to processing secret data. More particularly, the present disclosure concerns electronic devices adapted to implementing a wireless communication, such as a near-field communication (NFC) or an ultra-wideband communication (UWB), and where at least part of the exchanged data are secret data and/or part of the exchanged data are critical or private data allowing, for example, a method of identification or authentication of user, or enabling, for example, to locate a user.

Description of the Related Art

Complex electronic devices, such as cell phones, electronic tablets, computers, etc., integrate, over time, more and more functionalities and enable to provide digital services to integrate at best to everyday life. As an example, certain cell phones, and more particularly smart phones, integrate digital services such as a bank payment service, or a service of use of public transport tickets, show tickets, or also a digital key service, where an authentication of the user by a distant system (bank, public administration, etc.) is likely to be implemented. To implement these functionalities, these devices may integrate electronic components specific to these functionalities, such as for example secure components which enable to keep/store identification, reference, and authentication information, generally called "credentials," and assets of the provider of the digital service, motion sensors, a wireless communication module, such as a near-field communication (NFC) module or an ultra-wideband communication (UWB) module, etc.

A difficulty resulting from the adding of new functionalities is that secret data and/or critical or private data are exchanged between different modules and/or software layers of a same electronic device without being protected.

BRIEF SUMMARY

In an embodiment, an electronic device includes a processor and one or more secure elements. The processor executes a first high-level operating system and a first application. The one or more secure elements execute a first low-level operating system to verify a reliability, an authenticity, or a reliability and an authenticity of the first high-level operating system, and execute a second low-level operating system to execute a second application and to perform wireless communication with the first application. At each booting of the electronic device, the first low-level operating system performs a verification of the reliability, of the authenticity, or of the reliability and the authenticity of the first high-level operating system. In response to a request from the first application to the second application, the second low-level operating system requests a result of the verification from the first low-level operating system, and transmits the result to the second application.

In an embodiment, a method comprises: executing, using a processor of a device, a first high-level operating system and a first application; executing, using one or more secure elements of the device, a first low-level operating system to verify a reliability, an authenticity, or a reliability and an authenticity of the first high-level operating system, and a second low-level operating system to execute a second application and to perform wireless communication with the first application, wherein the method includes: at each booting of the electronic device, performing, using the first low-level operating system, a verification of the reliability, of the authenticity, or of the reliability and the authenticity of the first high-level operating system, and in response to a request from the first application to the second application, the second low-level operating system requests a result of the verification from the first low-level operating system, and transmits the result to the second application.

In an embodiment, a system comprises: a memory; a processor coupled to the memory, wherein the processor, in operation and using the memory, executes a first high-level operating system and a first application; and one or more secure elements, which, in operation, execute a first low-level operating system to verify a reliability, an authenticity, or a reliability and an authenticity of the first high-level operating system, and execute a second low-level operating system to execute a second application and to perform wireless communication with the first application, wherein at each booting of the electronic device, the first low-level operating system, in operation, performs a verification of the reliability, of the authenticity, or of the reliability and the authenticity of the first high-level operating system, and in response to a request from the first application to the second application, the second low-level operating system, in operation, requests a result of the verification from the first low-level operating system, and transmits the result to the second application.

In an embodiment, a non-transitory computer-readable medium's contents configure a device to perform a method, the method comprising: executing, using a processor of the device, a first high-level operating system and a first application; executing, using one or more secure elements of the device, a first low-level operating system to verify a reliability, an authenticity, or a reliability and an authenticity of the first high-level operating system, and a second low-level operating system to execute a second application and to perform wireless communication with the first application, wherein the method includes: at each booting of the electronic device, performing, using the first low-level operating system, a verification of the reliability, of the authenticity, or of the reliability and the authenticity of the first high-level operating system, and in response to a request from the first application to the second application, the second low-level operating system requests a result of the verification from the first low-level operating system, and transmits the result to the second application.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the operation of the different types of wireless communication capable of being implemented by the embodiments is not detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred, unless specified otherwise, to the orientation of the drawings.

Unless specified otherwise, the expressions "about," "approximately," "substantially," and "in the order of" signify plus or minus 10%, of plus or minus 5%.

Figure 1:
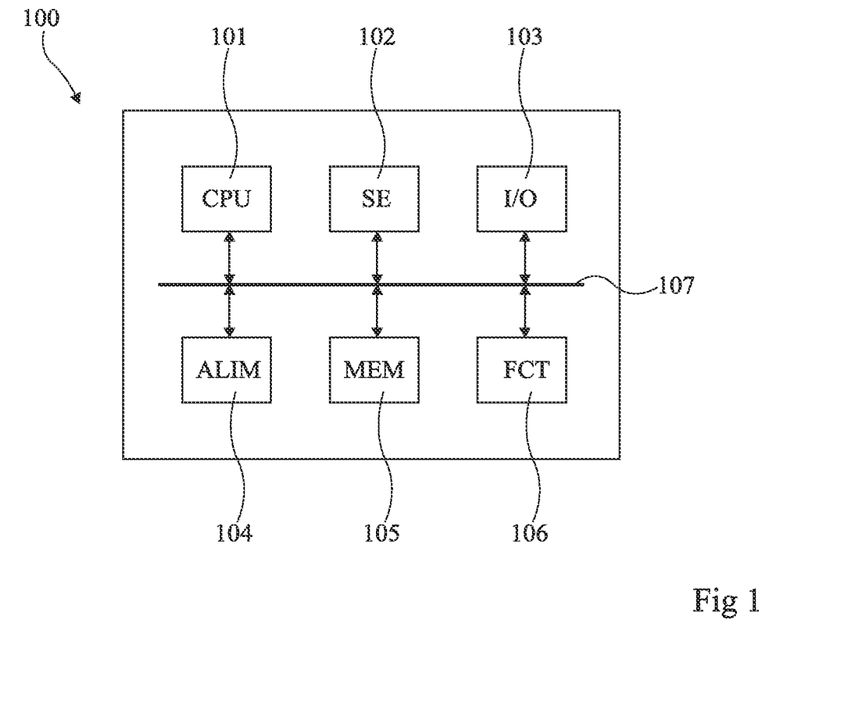
FIG. 1 very schematically shows in the form of blocks an example of an electronic device to which the embodiments of FIGS. 2 to 5 can be applied.

FIG. 1 very schematically shows in the form of blocks an example of an electric device 100 to which the embodiments described in relation with FIGS. 2 to 5 can apply.

Device 100 is an electronic device adapted to processing data, and which is particularly adapted to processing critical or private data. In the rest of the disclosure, there are called "critical" or private data comprising secret or potentially secret information, or information considered as private for a physical person such as a user. In other words, critical or private data are data which are not accessible to all and which cannot be shared with just any electronic device.

Device 100 comprises a processor 101 (CPU) enabling to process data. According to an example, device 100 may comprise a plurality of processors, each adapted to processing different types of data. According to a specific example, device 100 may comprise a main processor and one or a plurality of secondary processors.

Device 100 comprises one or a plurality of secure elements 102 (SE) enabling to manage critical or private data, such as the storage or the use of these data, or enabling, for example, to implement secure applications. A secure element 102 may comprise its own dedicated processor(s), as well as its own memory or memories. A secure element 102, and its operating system, is considered, in the rest of the disclosure, as reliable and tamper-resistant. In the rest of the disclosure, the expression "secure element" indifferently designates hereafter an embedded secure element or an integrated secure element.

Device 100 comprises one or a plurality of input/output circuits 103 (I/O) enabling device 100 to transmit and/or receive data and/or energy with one or a plurality of external electronic devices. In particular, the circuits enabling to manage communications with other devices, such as circuits, or modules, enabling to manage wired communications, such as communications using the USB protocol, and/or wireless communications, such as Wifi communications, Bluetooth communications, and/or near-field communications (NFC). The device more precisely comprises at least one NFC module, that is, a module adapted to near-field communication (NFC), and/or a UWB module, that is, a module adapted to ultra-wideband communication (UWB).

Device 100 comprises one or a plurality of circuits 104 (ALIM) taking charge the power supply of device 100. According to an example, circuits 104 may comprise one or a plurality of batteries, power conversion circuits, charge circuits, etc.

Device 100 comprises one or a plurality of memories 105 (MEM) having data, for example binary data, stored therein. According to an example, device 100 comprises a plurality of memory types, such as a ROM, a volatile, and/or a non-volatile memory.

Device 100 comprises one or a plurality of circuits 106 (FCT) implementing one or a plurality of functionalities of device 100. According to an example, circuits 106 may comprise specific data processing circuits, such as cipher circuits, or circuits enabling to perform measurements, such as sensors.

Device 100 comprises one or a plurality of communication buses 107 enabling all the circuits of device 100 to communicate. In FIG. 1, a single bus 107 coupling processor 101, memory or memories 102, and circuits 103 to 106 is shown, but in practice, device 100 may comprise a plurality of communication buses coupling these different elements. In particular, device 100 may comprise a plurality of communication buses shared by more than two circuits of the device, and/or one or a plurality of communication buses only coupling two circuits together. Further, a circuit of device 100 may be coupled to a plurality of communication buses.

Figure 2:
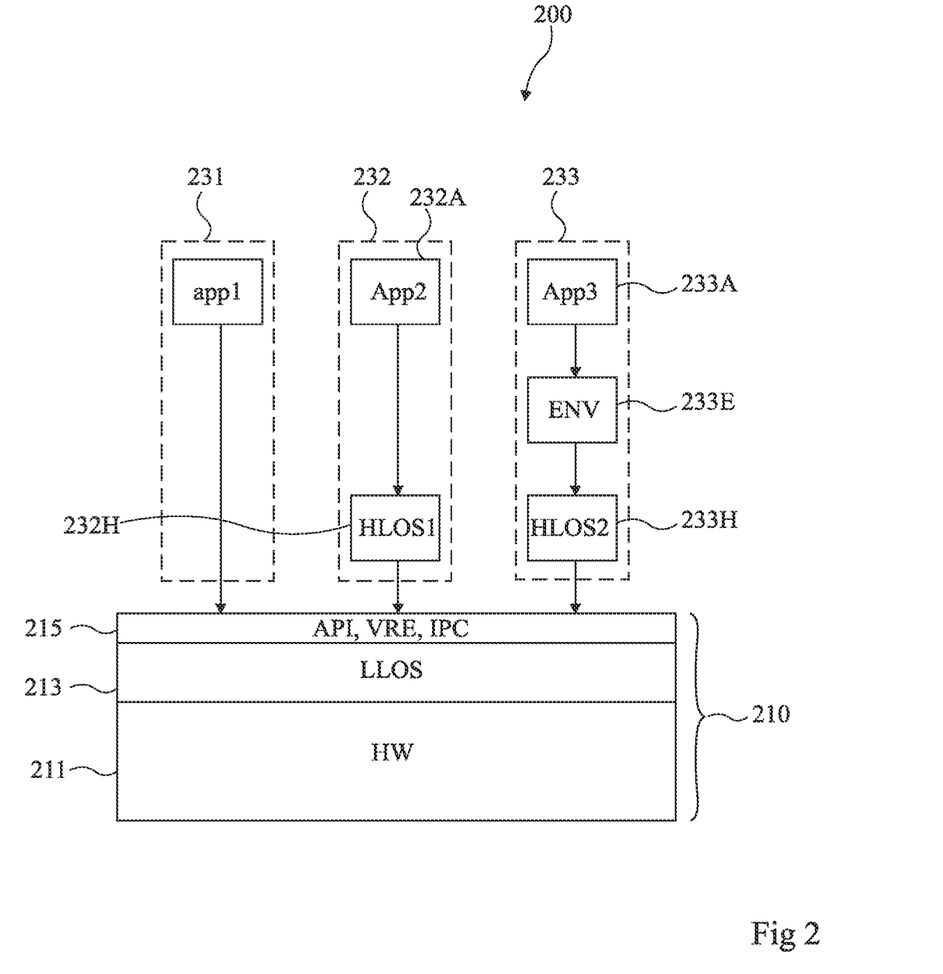
FIG. 2 very schematically shows in the form of blocks a software architecture of an electronic device.

FIG. 2 schematically shows in the form of blocks an embodiment of a software architecture 200 of an electronic device of the type of that described in relation with FIG. 1.

Architecture 200 comprises a virtual primary platform 210 (VPP), or primary platform 210, enabling to implement the different functionalities of the electronic device. Primary platform 210 is formed of three levels:

the access to electronic components 211 (HW, Hardware) of the electronic device;
one or a plurality of low-level operating systems 213 (LLOS); and
one or a plurality of software interfaces 215 (API, ABI, VRE, IPC).

Components 211 are the hardware of the electronic device. The components 211 of a secure element (see secure element 102 of FIG. 1) are, for example, the one or a plurality of processors, for example processor 101 (FIG. 1), one or a plurality of memories, for example memories 105 (FIG. 1), one or a plurality of communication devices, such as input/output circuits of the type of circuits 103 (FIG. 1), such as a near-field communication (NFC) device, a short-distance communication device using, for example, the Bluetooth standard, a device adapted to the ultra-wideband technology (UWB), or also sensors, such as biometric sensors.

Low-level operating systems 213 are software adapted to implementing components 211 to execute commands received from the applications implemented by the secure element. As an example, low-level operating systems 213 comprise all or part of the driver software of components 211.

A low-level operating system 213 is formed of an executable code and of execution data. The executable code contains instructions allowing the execution of functions of the program. By definition, the instructions are invariable for a given program, except for an update of the program which then modifies the instructions. The execution data are used by the executable code to contextualize the execution and perform the desired function.

Primary platform 210 communicates with applications implemented by the secure element via the software interfaces 215 executed by the primary platform. These interfaces 215 may comprise, among others:
- application programming interfaces (API);
- registers (VRE, Virtual Register); and
- storage buffer memories, or buffer memories, or also shared memories allowing the exchange of data between processes via inter-process communications (IPC).

Application programming interfaces are software enabling a plurality of applications, described in detail hereafter, to communicate together, or to communicate with one or a plurality of low-level operating systems. According to an example, the interface software enables to convert a command sent by an application into a command executable by low-level operating systems 213.

Registers are memory spaces linked to a hardware function of the electronic device and used to temporarily store data, for example when a command is sent to the primary platform 210 of the electronic device or during exchanges between processes executed by the primary platform.

The buffer memories (or shared memories) are used to store messages before their use by platform 210 or by applications of the electronic device. In practice, the buffer memories are memory spaces allocated in a memory of element 210, for example a volatile memory to which element 210 has access, such as memory 105.

As an example, software architecture 200 comprises at least three applications 231, 232, 233 adapted to being implemented by primary platform 210. Applications 231, 232, 233 are software or computer programs using the assets of the primary platform. Of course, the electronic device implements a number of applications within the limit of its computing capacities, and of its data storage capacities.

Like low-level operating systems 213, each application 231, 232, 233 is formed of an executable code and of execution data. The executable code contains instructions allowing the execution of the functions of the application. By definition, the instructions are invariable for a given application, except for an update of the program, which then modifies the instructions. The execution data are used by the executable code to contextualize the execution and perform the desired function.

Applications 231, 232, 233 may each be implemented by a different processor. According to an example, certain applications are implemented by the main processor of the electronic device, like processor 101, and other applications are implemented by the processor of the secure element, such as secure element 102.

Applications 231, 232, 233 may be adapted to implementing all sorts of functionalities. They generally implement digital services of a service provider, for example a payment service of EMV or transport ticket type. These applications may be combined with another application present in main processor 101 (FIG. 1), or in another trusted execution environment. The processor and the trusted execution environment are more capable of interacting with the user via a trusted user interface. Applications 231, 232, 233 are, for example, adapted to processing commands originating from communication interfaces, such as, for example, a bank transaction using a near-field communication device. These applications may be of different types, for example, a SIM (Subscriber Identity Module) application, a payment application, an application allowing the validation of a public transport ticket, etc.

According to an example of application type, application 231 (App1) is adapted to being directly implemented by primary platform 210 (VPP). Application 231 is, for example, an application enabling to make payments by communicating with a near-field communication (NFC) device.

According to another example of application type, application 232 is a set of instructions 232A (App2) adapted to being executed by using a high-level operating system 232H (HLOS1). A high-level operating system is software adapted to implementing different applications by providing them with a set of common software functions. Operating system 232H is the only portion of application 232 to communicate with primary platform 210. As a variant, it may also be considered that the high-level operating system, as well as all the applications which are attached thereto, are a single application adapted to being implemented by primary platform 210. Further, a high-level operating system may be an operating system attached to a processor of the electronic device. According to an example, in the rest of the disclosure, it is spoken of a high-level operating system of the main processor 101 of the electronic device, it then is the high-level operating system implementing the applications executed by main processor 101. It is also spoken of the high-level operating system of secure element 102, it then is the high-level operating system implementing the applications executed by secure element 102.

According to another example of type of application, another application 233 is a set of instructions 233A (App3) using an execution environment 233E (ENV) which itself uses a high-level operating system 233H (HLOS2). The execution environment is, for example, of Java or JavaCard type. Operating system 233H and execution environment 233E are the only portions of application 233 to communicate with primary platform 210. As a variant, it can also be considered that the high-level operating system, as well as all the applications which are attached thereto, are an application adapted to being implemented by primary platform 210.

An example of implementation of application 231, 232, or 233 is the following. When an application 231, 232, or 233 desires to use a hardware asset of the secure element, that is, one or a plurality of components 211 of primary platform 210, this means that the current operations executed on the fixed data are considered as completed. The application may then execute different commands such as, for example, forcing a writing into a non-volatile memory. For this purpose, the application sends a command and/or data to primary platform 210 via interfaces 215. The command is taken charge of by one or a plurality of application programming interfaces before being sent to low-level operating systems 213, that is, the command is divided into a plurality of operations. The data are stored in registers or transmitted via inter-process communications (IPC). Low-level operating systems 213 answer the requests of the binary-program interfaces by applying the operations requested by the binary-program interfaces to the data stored in the registers. Low-level operating systems 213 then drive components 211 to execute what is requested by the application.

Figure 3:
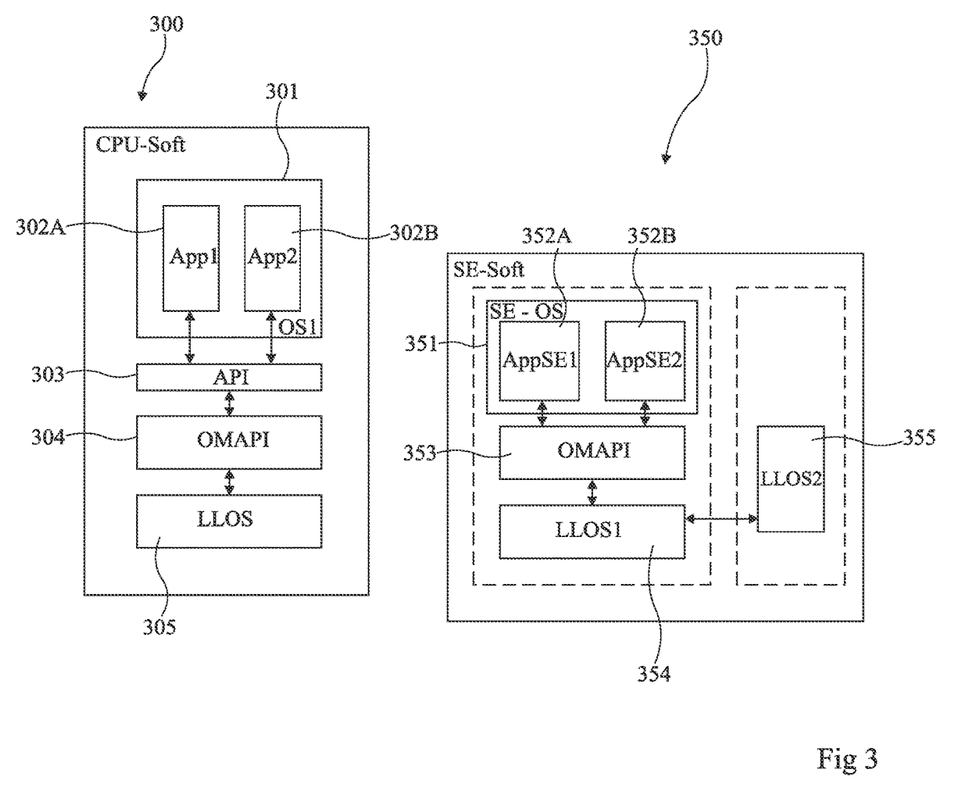
FIG. 3 very schematically shows in the form of blocks a first embodiment of an electronic device processing critical or private data.

FIG. 3 very schematically shows in the form of blocks a more specific first example of a software architecture used in an electronic device, of the type of that described in relation with FIG. 1, forming an embodiment.

As previously described, the embodiment of the electronic device comprises a main processor, or application processor, and at least one secure element. The main processor and the secure element are both adapted to implementing one or a plurality of applications.

In particular, the main processor implements the following software architecture 300 (CPU_Soft). The main processor implements a high-level operating system 301 (OS1) enabling it to implement one or a plurality of applications. In the case illustrated in relation with FIG. 3, the main processor is adapted to implementing, via high-level operating system 301, two applications 302A (App1) and 302B (App2). The main processor is adapted to implementing given software comprised in the primary platform, that is, at least one or a plurality of application programming interfaces 303 (API), at least one filtering layer 304 (OMAPI), and at least one low-level operating system 305 (LLOS). According to an example, software architecture 300 corresponds to the software architecture of a smartphone designated by trade name Android.

Application programming interfaces 303 are interfaces adapted to receiving commands and/or data from applications and to converting them before their transmission to other applications or other software layers of architecture 301. In other words, an application programming interface is a software layer enabling, among others, to take charge of the external communications of one or a plurality of applications.

Filtering layer 304 is software forming part of software interfaces 215 and is adapted to authorizing, limiting, or forbidding the use of all or part of a plurality of circuits or components of the electronic device to an application, for example applications 302A and 302B. In other words, filtering layer 304 receives the commands sent by application programming interfaces 303 and decides whether to transmit them or not according to the application which has formulated the initial command. Filtering layer 304 may be based on different criteria to authorize or not the access to the circuits and components of the device for an application. According to an example, filtering layer 304 may authorize the access to a circuit or component of the electronic device or a portion thereof to a first application, and forbid this access to a second application. According to an example, filtering layer 304 is an OMAPI layer defined by the standard currently designated by name GlobalPlatform.

According to a first example, if the application is a system application, that is, an application produced by the manufacturer of the electronic device, or by the manufacturer or designer of software 303, the application may have a permanent authorization of access to all the circuits or components, or only to circuits and components selected by the manufacturer. Further, conversely, a system application may have a limited access, permanent or not, to all or part of a plurality of circuits or components of the electronic device. Thus, certain portions of circuits or components, or certain circuits or components of the electronic device may be accessible to system applications only, and an application which does not fulfill this criterion will systematically receive a denial each time it will attempt to send a command to these portions of a circuit or components, or circuits or components.

According to a second example, the application may be a reliable application having been successfully submitted to different reliability tests by the manufacturer of the electronic device, or by the manufacturer or designer of interfaces 303, which has thus permanently authorized it to access to all or part of the circuits or components of the electronic device. A reliable application of this type may be considered as equivalent to a system application and thus have the same characteristics.

According to a third example, the application may have the possibility of authenticating, periodically, with a server external to the electronic device to obtain a temporary authorization of access to all or part of the circuits and components of the electronic device. In the rest of the disclosure, it will be said that an application is authorized to have access to such circuit or to such component of the electronic device if filtering layer 304 authorizes it the access thereto. According to an example, the temporary authorization of access to the circuits and components of the electronic device may be kept by interfaces 303, interfaces 303 being, for example, adapted to implementing the authentication of the application with the external server.

According to a fourth example, a circuit or component of the electronic device, for example secure element 102, may be adapted to determining which applications are authorized to implement one or a plurality of its functions. A circuit or component of the electronic device may, for example, supply filtering layer 304 with a list indicating what application is authorized to implement one or a plurality of its functions. According to a variant, this circuit or component may deliver temporary authorizations to all or part of an application, for example, by authorizing a number of uses of one or a plurality of its functions. Filtering layer 304 applies these authorizations at the time when an application sends orders to use one or a plurality of functions of one a plurality of circuits or components of the electronic device. According to an embodiment, the secure element of the electronic device comprises a list of rules, for example stored in a memory, indicating the authorizations of the different applications implemented by the electronic device.

According to a fifth example, the secure element of the electronic device delivers a list of rules of access to applications 302A and 302B to filtering layer 304. The rules are loaded into filtering layer 304 and applied at each appeal to applications 302A and 302B. According to an example, the list of rules may be updated directly in the secure element, for example, distantly. After an update of the list of rules, the secure element delivers the list of modified rules to filtering layer 304. This operation may be performed during the rebooting of the electronic device, or during the operation of the electronic device.

The secure element implements the following software architecture 350 (SE_Soft). The secure element implements a high-level operating system 351 (SE_OS), considered as reliable and secure, and enabling to implement one or a plurality of applications. In the case illustrated in relation with FIG. 3, the secure element is adapted to implementing, via the high-level operating system 351, two applications 352A (AppSE1) and 352B (AppSE2).

The secure element also stores the rules 353 of the interfaces 303 of the main processor. According to an embodiment, the secure element sends rules 353 to interfaces 303, it may also, for example, perform updates of these rules 353.

Further, the secure element may implement a plurality of low-level operating systems independent from one another. In FIG. 3, the secure element implements two low-level operating systems 354 and 355 totally independent from one another.

According to an embodiment, low-level operating system 354 is an operating system having the following features. Low-level operating system 354 enables to implement a communication using a wireless communication system such as a near-field communication (NFC) system, or an ultra-wideband (UWB) communication system. Operating system 354 is configured to implement, more particularly, a transaction by using this wireless communication system, that is, a communication where an exchange of critical or private data, such as identification data, bank data, or others, may occur. Further, applications 352A and 352B are both configured to exchange commands with low-level operating system 354, for example via rules 353. According to an example, low-level operating system is the program known under denomination Global Platform (GP) and/or the program known under denomination Java Card Virtual Machine (JCVM).

According to an embodiment, low-level operating system 355 is an operating system exhibiting the following features. Operating system 355 is adapted to verifying the reliability of the high-level operating system 301 of the main processor, and/or to verifying the authenticity of the high-level operating system 301 of the main processor. More particularly, operating system 355 is adapted to verifying whether high-level operating system 301 is still in accordance with the version of high-level operating system 301 produced by the designer of the electronic device. Further, operating system 355 is adapted to storing the result of this verification. The verification method and its use are described in further detail in relation with FIG. 4. According to an example, the low-level operating system is the program known under denomination Trust Platform Module (TPM).

According to an embodiment, low-level operating systems 354 and 355 are adapted to exchanging data and commands with each other, for example by using a dedicated communication channel. According to an example, this dedicated communication channel may be a communication bus, a shared memory, or a common register.

Further, according to an example, the secure element may be formed of two distinct electronic chips, a first chip implementing high-level operating system 351, applications 352A and 352B, rules 353, and low-level operating system 354, and a second chip implementing low-level operating system 355. These two different chips are indicated by blocks in dotted lines in FIG. 3. According to another example, the two chips can be considered as two distinct secure elements.

According to another example, high-level operating system 351, applications 352A and 352B, rules 353, and low-level operating system 354, and low-level operating system 355 may be implemented by a single electronic chip, this chip being adapted to adapting its operation according to the implemented low-level operating system 354 or 355.

Figure 4:
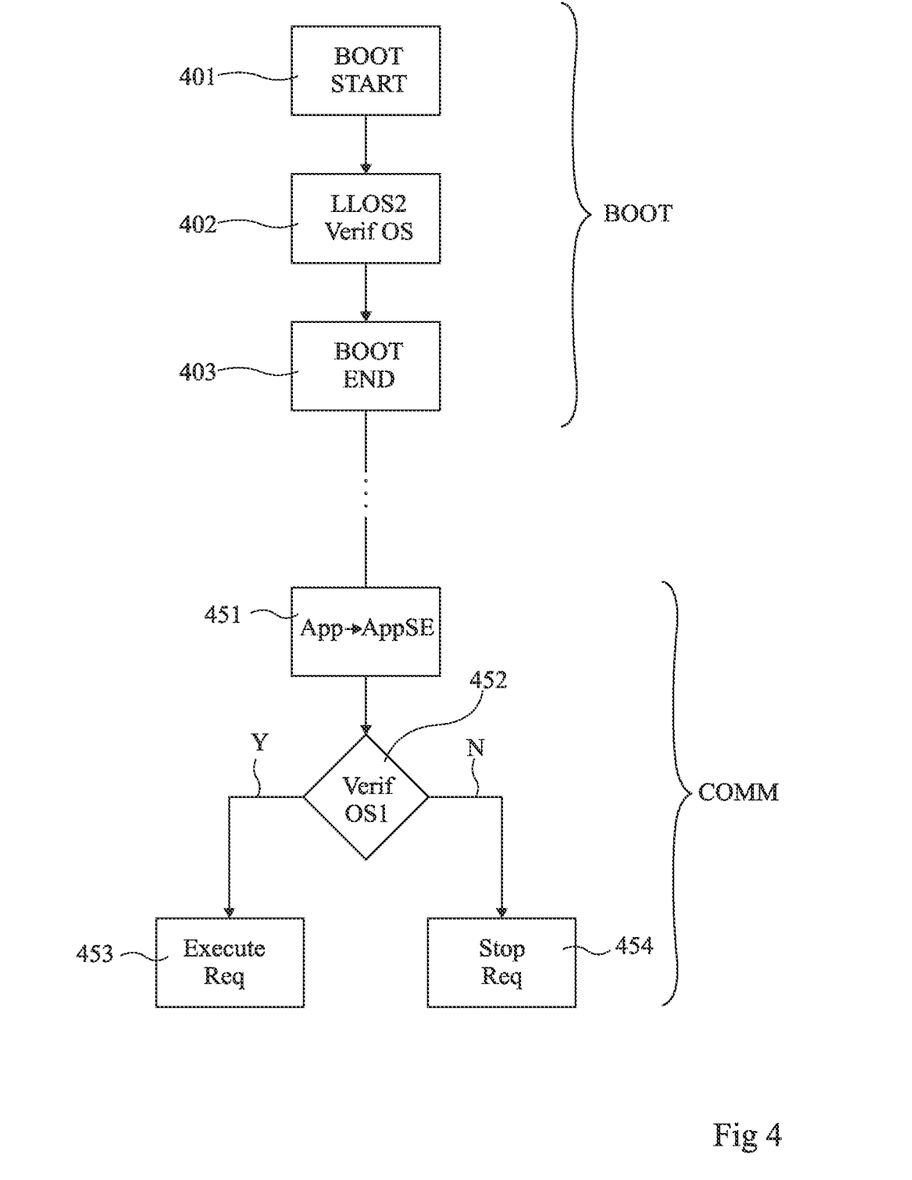
FIG. 4 shows a block diagram illustrating an implementation mode of the embodiment of FIG. 3.

FIG. 4 is a block diagram showing an embodiment of a method of protection of the device having its software architecture described in relation with FIG. 3.

The method of protection of the electronic device comprises two phases. A first phase BOOT occurs during the booting of the electronic device, and a second phase COMM occurs at the time when an application implemented by the main processor asks to communicate with an application implemented by the secure element.

During first phase BOOT, at a first step 401 (BOOT START), the electronic device starts in hardware fashion and in software fashion.

At a step 402 (LLOS2 Verif OS), following step 401, low-level operating system 355, described in relation with FIG. 3, performs a verification of software architecture 300, that is, of the high-level operating system 301 and of the software layers 303 to 305, described with reference to FIG. 3, of the main processor of the electronic device. By this verification, low-level operating system 355 determines whether software architecture 300 is reliable, or authentic, that is, allowing exchanges of critical or private or secret data between high-level operating system 301 and the applications 302A and 302B that it implements. According to an example, by this verification, low-level operating system 355 determines whether software architecture 300 is authentic, that is, provided by the manufacturer of architecture 300 or of the device implementing it. For this purpose, low-level operating system 355 may, for example, verify all or part of the programming code of software architecture 300. Further, low-level operating system 355 may determine that one or a plurality of portions of the software architecture 300 are reliable, and that one or a plurality of other portions of software architecture 300 are not reliable. Once the verification has been performed, low-level operating system 355 stores the result thereof.

According to a variant, if the main processor of the electronic device implements a plurality of high-level operating systems of the type of software architecture 300, then, at step 402, low-level operating system 355 performs the verification of all the operating systems implemented by the main processor. According to another variant, the low-level operating system might only perform the verification of certain high-level operating systems of the software architecture, such as for example, the main high-level operating systems, or the verification of certain software layers only of software architecture 300.

At a step 403 (BOOT END), following step 402, the electronic device has ended its booting and is ready to be used.

During second phase COMM, at a first step 451 (App→AppSE), an application implemented by the high-level operating system 301 of the main processor, for example application 302A, asks to be connected to an application implemented by the high-level operating system 351 of the secure element, for example application 352A. More particularly, application 302A sends a request to an application programming interface 303. This request is verified by filtering interface 304, and if filtering interface 304 validates the request, then the low-level operating system 305 of the main processor transfers the request to the secure element. Since the request is intended for application 352A, low-level operating system 354 receives the request.

At a step 452 (Verif OS1), low-level operating system 354 receives the request initiated by application 302A, and does not transmit the request to the addressee application 352A as long as it has not made sure that the high-level operating system 301 implementing the application 302A is reliable. For this purpose, operating system 354 interrogates low-level operating system 355 about the reliability of software architecture 300. Low-level operating system 355 transmits the result of the verification performed during first phase BOOT to low-level operating system 354. Low-level operating system 354 can then transmit the request to the addressee application 352A, and make the result of the verification accessible to application 352A. According to a first example, low-level operating system 354 may send the result of the verification along with the request to application 352A. According to a second example, low-level operating system 354 may make the information accessible via an application programming interface of the same type as interfaces 303, to the application 352A.

The application 352A having access to the result of the verification, it can take the information into account. If software architecture 300 is considered as reliable (output Y of step 452), the next step is a step 453 (Execute Req), otherwise (output N of step 452), the next step is a step 454 (Stop Req).

At step 453, software architecture 300 is considered as reliable, application 352A can process and, if relevant, answer the request of application 302A, for example by using critical or private or secret data.

At step 454, software architecture 300 is considered as non-reliable, at least partly, application 352A thus takes this information into account. According to a first example, application 352A may decide not to process and, if relevant, not to answer the request from application 302A, for example by returning no data or by returning error data or random data. According to a second example, application 352A may decide to partly process and, if relevant, to only partly answer the request from application 302A, for example by disclosing no critical or private or secret data. According to a third example, application 352A may decide to nevertheless process and, if relevant, to answer the request from application 302A, for example if the received request concerns no critical or secret data, or for example if the received request does not endanger application 352A, like for example an attack of denial-of-service type.

Figure 5:
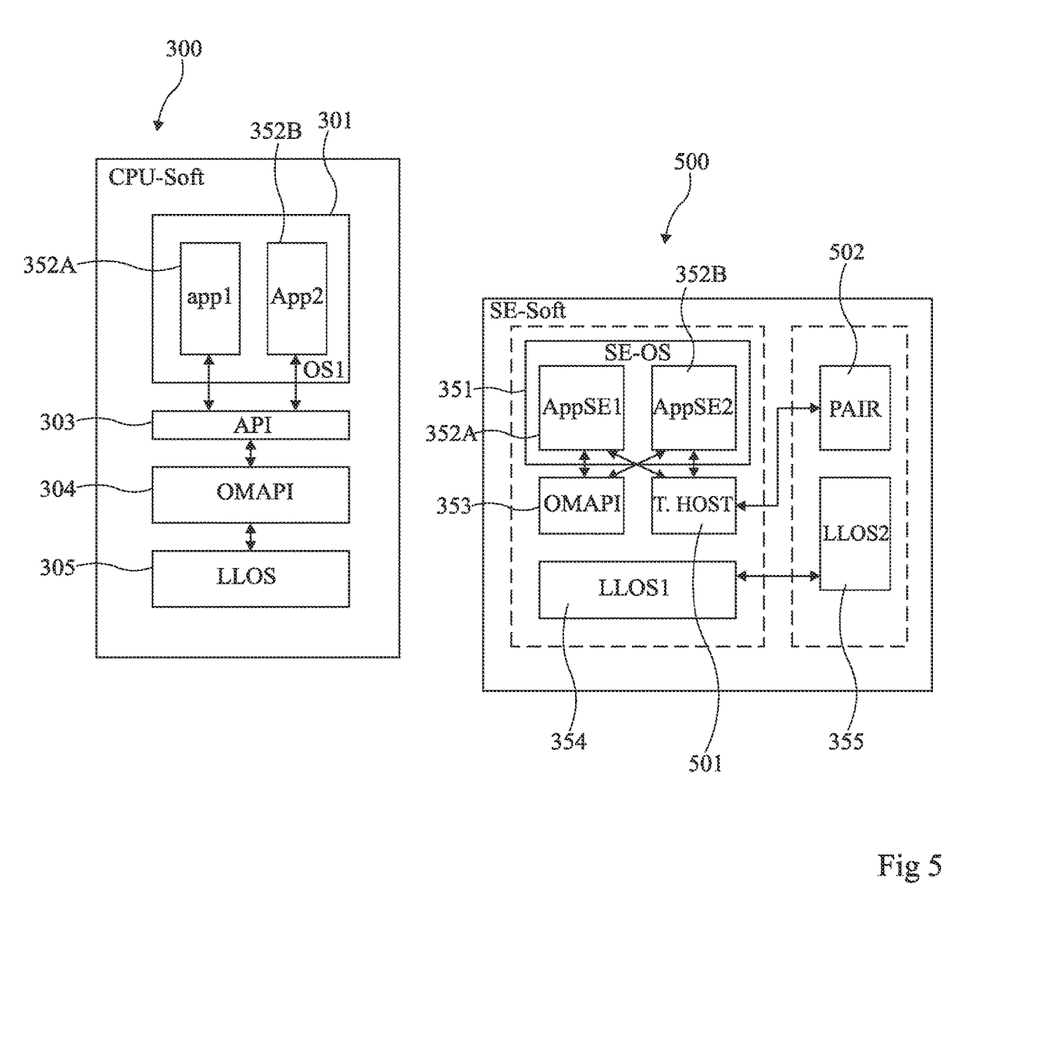
FIG. 5 very schematically shows in the form of blocks a second embodiment of an electronic device processing critical or private data.

FIG. 5 very schematically shows, in the form of blocks, a second more specific example of a software architecture used in an electronic device, of the type of that described in relation with FIG. 1, forming an embodiment.

This second example may comprise elements common with the first example described in relation with FIG. 3. These common elements are not described again in detail herein, and only the differences between these two examples are highlighted.

In this second example, the main processor may use the same software architecture 300 as in the first example, or an architecture of the same type. The secure element uses a software architecture 500 comprising elements common with the architecture 350 described in relation with FIG. 3.

Like software architecture 350, software architecture 500 comprises high-level operating system 351 (SE_OS), considered as reliable and secure, and enabling to implement one or a plurality of applications, in the case illustrated in relation with FIG. 3, two applications 352A (AppSE1) and 352B (AppSE2). Further, software architecture 500 may comprise the rules 353 of the interfaces 303 of the main processor. According to an example, software architecture 500 may comprise low-level operating system 354 enabling to implement applications 352A and 352B. According to an example, and optionally, software architecture 500 may also comprise the low-level operating system 355 described in relation with FIG. 3.

According to an embodiment, software architecture 500 further comprises an application programming interface 501 (T. HOST) configured to verify whether the commands received by the applications implemented by the secure element, that is, applications 352A and 352B in the case of FIG. 5, have been reliably sent. For this purpose, application programming interface 501 may be configured to implement a plurality of different verification means, or different verifications rules, some of which are detailed hereafter. Once the verification has been performed, the result of this verification is transmitted to the application having the command addressed thereto, in parallel with the actual command. The application analyzes this result and deduces therefrom whether it can process, or not, partly or totally, said command. Further, application programming interface 501 is, further, configured to validate the authenticity of the verifications that it performs.

An example of means of verification may be to verify that the sender of the command is reliable.

The sender of the command may be, according to a first example, one of the applications implemented by the main processor of the electronic device. In this case, application programming interface 501 can verify the reliability of the application in question. If the architecture comprises low-level operating system 355, application programming interface 501 may communicate with low-level operating system 355 to use the result of the verification of the high-level operating system 301 described in relation with FIGS. 3 and 4.

The sender of the command may be, according to a second example, an electronic system external to the electronic device, and implementing a communication with said electronic device. According to an example, the communication may be a wired communication or a wireless communication such as a near-field communication (NFC) or an ultra-wideband communication (UWB). According to an example, the electronic system may be an electronic system with which the electronic device is adapted to being paired, for example by using a pairing function 502 (PAIR). Pairing function 502 may be implemented by the same chip as low-level operating system 355, by low-level operating system 354, or also be implemented by an application programming interface implemented by the same chip as low-level operating system 354.

Another example of means of verification may be to verify the communication channel used to transmit the commands.

Other means of verification are within the abilities of those skilled in the art.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

According to a first aspect, an embodiment provides an electronic device comprising:
 a processor adapted to implementing at least one first high-level operating system and at least one first application;
 a secure element adapted to implementing a first low-level operating system configured to implement the verification of the reliability or the authenticity of the first operating system, and a second low-level operating system configured to implement at least one second application and to implement at least one wireless communication or to communicate with said at least one first application,
 wherein at each booting of the electronic device, the first low-level operating system performs a verification of the reliability or of the authenticity of the first high-level operating system, and when said at least one first application sends a request to said at least one second application, said second low-level operating system asks the first low-level operating system for said result and makes it accessible by the second application.

Another embodiment provides a method of protection of an electronic device comprising:
- a processor adapted to implementing at least one first high-level operating system and at least one first application;
- a secure element adapted to implementing a first low-level operating system configured to implement the verification of the reliability or of the authenticity of the first operating system, and a second low-level operating system configured to implement at least one second application and to implement at least one wireless communication or to communicate with said at least one first application,
- wherein at each booting of the electronic device, the first low-level operating system performs a verification of the reliability or of the authenticity of the first high-level operating system, and
- when said at least one first application sends a request to said at least one second application, said second low-level operating system asks the first low-level operating system for said result and makes it accessible by the second application.

According to an embodiment, when said result indicates that the first high-level operating system is reliable or authentic, then said at least one second application accepts the request from said at least one first application.

According to an embodiment, when said result indicates that the first operating system is not reliable or authentic then said at least one second application can refuse, partially accept, or fully accept the request from said at least one first application.

According to an embodiment, when said at least one second application refuses, partially accepts, or fully accepts the request from said at least one first application, said at least one second application takes into account a list of rules of access authorization of said at least one first application.

According to an embodiment, when the first low-level operating system performs the verification of the reliability of the first operating system, the first low-level operating system stores said result.

According to an embodiment, when the second low-level operating system makes said result accessible to the second application, the second low-level operating system sends said result to said at least one second application.

According to an embodiment, when the second low-level operating system makes said result accessible to the second application, the second low-level operating system makes said result available to said at least one second application via a first application programming interface.

According to an embodiment, the first high-level operating system is the program known under denomination Trust Platform Module.

According to an embodiment, the second low-level operating system is the program known under denomination Global Platform and/or the program known under denomination Java Card Virtual Machine.

According to an embodiment, said first and second low-level operating systems are adapted to communicating via a dedicated communication channel.

According to an embodiment, the secure element comprises a first electronic chip implementing said first low-level operating system, and a second electronic chip, different from the first chip, implementing said second low-level operating system.

According to an embodiment, the first chip is considered as a first secure element, and the second chip is considered as a second secure element.

According to an embodiment, the secure element is adapted to implementing at least one second application programming interface configured to verify whether a command received by said at least one second application has been reliably sent.

According to an embodiment, wherein said second application programming interface is configured to use a plurality of verification means.

According to an embodiment, said second application programming interface is configured to verify whether the sender of said command is reliable.

According to an embodiment, the application programming interface is configured to verify whether said high-level operating system is authentic.

According to a second aspect, an embodiment provides an electronic device comprising a secure element adapted to implementing at least one first application, and an application programming interface configured to verify whether a command received by said at least one first application has been reliably sent.

Another embodiment provides a method of protection of an electronic device comprising a secure element adapted to implementing at least one first application, and an application programming interface configured to verify whether a command received by said at least one first application has been reliably sent.

According to an embodiment, the application programming interface is configured to use a plurality of verification means.

According to an embodiment, once said application programming interface has performed the verification, said application programming interface transmits said command to said at least one first application, and sends the result of this verification to said first application.

According to an embodiment, the application programming interface is configured to verify whether the sender of said command is reliable.

According to an embodiment, the sender is a second application implemented by a high-level operating system of a processor comprised in said electronic device.

According to an embodiment, the application programming interface is configured to verify whether said high-level operating system is reliable or authentic.

According to an embodiment, the secure element implements a first low-level operating system implementing said first application, and a second low-level operating system configured to verify whether the high-level operating system of said processor is reliable or authentic,
- the application programming interface verifies that said high-level operating system is reliable by communicating with said first low-level operating system of the secure element.

According to an embodiment, the sender is an electronic system independent from the electronic device, said electronic system being adapted to being paired with said electronic device.

According to an embodiment, said electronic system is adapted to being paired with said electronic device by using a pairing function.

According to an embodiment, the application programming interface is, further, configured to verify that the communication channel used to transmit the command is a reliable channel.

According to an embodiment, the application programming interface is, further, configured to validate the authenticity of the verification of said command received by said at least one first application.

According to an embodiment, said verification is performed by implementing verification means parameterizable by the application programming interface according to the pairing function.

In an embodiment, an electronic device includes a processor and one or more secure elements. The processor executes a first high-level operating system and a first application. The one or more secure elements execute a first low-level operating system to verify a reliability, an authenticity, or a reliability and an authenticity of the first high-level operating system, and execute a second low-level operating system to execute a second application and to perform wireless communication with the first application. At each booting of the electronic device, the first low-level operating system performs a verification of the reliability, of the authenticity, or of the reliability and the authenticity of the first high-level operating system. In response to a request from the first application to the second application, the second low-level operating system requests a result of the verification from the first low-level operating system, and transmits the result to the second application.

In an embodiment, in response to the result indicating that the first high-level operating system is reliable or authentic, the second application accepts the request from the first application.

In an embodiment, in response to the result indicating that the first operating system is not reliable or authentic, the second application refuses, partially accepts, or fully accepts the request from the first application.

In an embodiment, the second application refuses, partially accepts, or fully accepts the request from the first application based on a list of rules of access authorization associated with the first application.

In an embodiment, when the first low-level operating system verifies the reliability of the first high-level operation system, the first low-level operation system stores the result of the verification of the reliability of the first high-level operating system.

In an embodiment, the second low-level operating system transmits the result to the second application via a first application programming interface.

In an embodiment, the first high-level operating system is a trust platform module.

In an embodiment, the second low-level operating system is a program compliant with: a Global Platform standard; a Java Card Virtual Machine; or a Global Platform standard and a Java Card Virtual Machine.

In an embodiment, the first and second low-level operating systems, in operation, communicate via a dedicated communication channel.

In an embodiment, the one or more secure elements comprise a first chip, which, in operation, executes the first low-level operating system, and a second chip, different from the first chip, which, in operation, executes the second low-level operating system.

In an embodiment, the first chip is a first secure element, and the second chip is a second secure element of the one or more secure elements.

In an embodiment, the one or more secure elements, in operation, execute a second application programming interface, which, in operation, verifies whether a command received by the second application has been reliably sent.

In an embodiment, the second application programming interface, in operation, applies a plurality of verification tests.

In an embodiment, the second application programming interface, in operation, verifies whether a sender of the command is reliable.

In an embodiment, a method comprises: executing, using a processor of a device, a first high-level operating system and a first application; executing, using one or more secure elements of the device, a first low-level operating system to verify a reliability, an authenticity, or a reliability and an authenticity of the first high-level operating system, and a second low-level operating system to execute a second application and to perform wireless communication with the first application, wherein the method includes: at each booting of the electronic device, performing, using the first low-level operating system, a verification of the reliability, of the authenticity, or of the reliability and the authenticity of the first high-level operating system, and in response to a request from the first application to the second application, the second low-level operating system requests a result of the verification from the first low-level operating system, and transmits the result to the second application.

In an embodiment, in response to the result indicating that the first high-level operating system is reliable or authentic, the second application accepts the request from the first application.

In an embodiment, in response to the result indicating that the first operating system is not reliable or authentic, the second application refuses, partially accepts, or fully accepts the request from the first application.

In an embodiment, the second application refuses, partially accepts, or fully accepts the request from the first application based on a list of rules of access authorization associated with the first application.

In an embodiment, the method comprises storing, by the first low-level operation system, a result of the verification of the reliability of the first high-level operating system.

In an embodiment, the method comprises transmitting, by the second low-level operating system, the result to the second application via a first application programming interface.

In an embodiment, the method comprising executing, by the one or more secure elements, a second application programming interface to verify whether a command received by the second application has been reliably sent.

In an embodiment, a system comprises: a memory; a processor coupled to the memory, wherein the processor, in operation and using the memory, executes a first high-level operating system and a first application; and one or more secure elements, which, in operation, execute a first low-level operating system to verify a reliability, an authenticity, or a reliability and an authenticity of the first high-level operating system, and execute a second low-level operating system to execute a second application and to perform wireless communication with the first application, wherein at each booting of the electronic device, the first low-level operating system, in operation, performs a verification of the reliability, of the authenticity, or of the reliability and the authenticity of the first high-level operating system, and in response to a request from the first application to the second application, the second low-level operating system, in operation, requests a result of the verification from the first low-level operating system, and transmits the result to the second application.

In an embodiment, in response to the result indicating that the first high-level operating system is reliable or authentic, the second application accepts the request from the first application.

In an embodiment, the system comprises a dedicated communication channel, wherein the first and second low-level operating systems, in operation, communicate via the dedicated communication channel.

In an embodiment, the one or more secure elements comprise a first chip, which, in operation, executes the first low-level operating system, and a second chip, different from the first chip, which, in operation, executes the second low-level operating system.

In an embodiment, a non-transitory computer-readable medium's contents configure a device to perform a method, the method comprising: executing, using a processor of the device, a first high-level operating system and a first application; executing, using one or more secure elements of the device, a first low-level operating system to verify a reliability, an authenticity, or a reliability and an authenticity of the first high-level operating system, and a second low-level operating system to execute a second application and to perform wireless communication with the first application, wherein the method includes: at each booting of the electronic device, performing, using the first low-level operating system, a verification of the reliability, of the authenticity, or of the reliability and the authenticity of the first high-level operating system, and in response to a request from the first application to the second application, the second low-level operating system requests a result of the verification from the first low-level operating system, and transmits the result to the second application. In an embodiment, the contents comprise instructions executable by the device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device comprising:
a processor, which, in operation, executes a first high-level operating system and a first application; and
one or more secure elements, which, in operation,
execute a first low-level operating system to verify a reliability, an authenticity, or a reliability and an authenticity of the first high-level operating system, and
execute a second low-level operating system to execute a second application and to perform wireless communication with the first application, wherein:
at each booting of the electronic device, the first low-level operating system, in operation, performs a verification of the reliability, of the authenticity, or of the reliability and the authenticity of the first high-level operating system, and
in response to a request from the first application to the second application, the second low-level operating system, in operation, requests a result of the verification from the first low-level operating system, and transmits the result to the second application.

2. The electronic device according to claim 1, wherein in response to the result indicating that the first high-level operating system is reliable or authentic, the second application accepts the request from the first application.

3. The electronic device according to claim 1, wherein in response to the result indicating that the first operating system is not reliable or authentic, the second application refuses, partially accepts, or fully accepts the request from the first application.

4. The electronic device according to claim 1, wherein the second application refuses, partially accepts, or fully accepts the request from the first application based on a list of rules of access authorization associated with the first application.

5. The electronic device according to claim 1, wherein when the first low-level operating system verifies the reliability of the first high-level operating system, the first low-level operating system stores the result of the verification of the reliability of the first high-level operating system.

6. The electronic device according to claim 1, wherein the second low-level operating system transmits the result to the second application via a first application programming interface.

7. The electronic device according to claim 1, wherein the first high-level operating system is a trust platform module.

8. The electronic device according to claim 1, wherein the second low-level operating system is a program compliant with:
a Global Platform standard;
a Java Card Virtual Machine; or
a Global Platform standard and a Java Card Virtual Machine.

9. The electronic device according to claim 1, wherein the first and second low-level operating systems, in operation, communicate via a dedicated communication channel.

10. The electronic device according to claim 1, wherein the one or more secure elements comprise a first chip, which, in operation, executes the first low-level operating system, and a second chip, different from the first chip, which, in operation, executes the second low-level operating system.

11. The electronic device according to claim 10, wherein the first chip is a first secure element, and the second chip is a second secure element of the one or more secure elements.

12. The electronic device according to claim 6, wherein the one or more secure elements, in operation, execute a second application programming interface, which, in operation, verifies whether a command received by the second application has been reliably sent.

13. The electronic device according to claim 12, wherein the second application programming interface, in operation, applies a plurality of verification tests.

14. The device according to claim 12, wherein the second application programming interface, in operation, verifies whether a sender of the command is reliable.

15. A method, comprising:
executing, using a processor of an electronic device, a first high-level operating system and a first application;
executing, using one or more secure elements of the electronic device,
a first low-level operating system to verify a reliability, an authenticity, or a reliability and an authenticity of the first high-level operating system, and
a second low-level operating system to execute a second application and to perform wireless communication with the first application, wherein the method includes:
at each booting of the electronic device, performing, using the first low-level operating system, a verification of the reliability, of the authenticity, or of the reliability and the authenticity of the first high-level operating system; and
in response to a request from the first application to the second application, the second low-level operating system requests a result of the verification from the first low-level operating system, and transmits the result to the second application.

16. The method according to claim 15, wherein in response to the result indicating that the first high-level operating system is reliable or authentic, the second application accepts the request from the first application.

17. The method according to claim 15, wherein in response to the result indicating that the first operating system is not reliable or authentic, the second application refuses, partially accepts, or fully accepts the request from the first application.

18. The method according to claim 15, wherein the second application refuses, partially accepts, or fully accepts the request from the first application based on a list of rules of access authorization associated with the first application.

19. The method according to claim 15, comprising, storing, by the first low-level operating system, a result of the verification of the reliability of the first high-level operating system.

20. The method according to claim 15, comprising transmitting, by the second low-level operating system, the result to the second application via a first application programming interface.

21. The method according to claim 20, comprising executing, by the one or more secure elements, a second application programming interface to verify whether a command received by the second application has been reliably sent.

22. A system, comprising:
a memory;
a processor coupled to the memory, wherein the processor, in operation and using the memory, executes a first high-level operating system and a first application; and
one or more secure elements, which, in operation,
execute a first low-level operating system to verify a reliability, an authenticity, or a reliability and an authenticity of the first high-level operating system, and
execute a second low-level operating system to execute a second application and to perform wireless communication with the first application, wherein
at each booting of the system, the first low-level operating system, in operation, performs a verification of the reliability, of the authenticity, or of the reliability and the authenticity of the first high-level operating system, and
in response to a request from the first application to the second application, the second low-level operating system, in operation, requests a result of the verification from the first low-level operating system, and transmits the result to the second application.

23. The system according to claim 22, wherein in response to the result indicating that the first high-level operating system is reliable or authentic, the second application accepts the request from the first application.

24. The system of claim 22, comprising a dedicated communication channel, wherein the first and second low-level operating systems, in operation, communicate via the dedicated communication channel.

25. The system according to claim 22, wherein the one or more secure elements comprise a first chip, which, in operation, executes the first low-level operating system, and a second chip, different from the first chip, which, in operation, executes the second low-level operating system.

26. A non-transitory computer-readable medium having contents which configure an electronic device to perform a method, the method comprising:
executing, using a processor of the electronic device, a first high-level operating system and a first application;
executing, using one or more secure elements of the electronic device,
a first low-level operating system to verify a reliability, an authenticity, or a reliability and an authenticity of the first high-level operating system, and
a second low-level operating system to execute a second application and to perform wireless communication with the first application, wherein the method includes:
at each booting of the electronic device, performing, using the first low-level operating system, a verification of the reliability, of the authenticity, or of the reliability and the authenticity of the first high-level operating system; and
in response to a request from the first application to the second application, the second low-level operating system requests a result of the verification from the first low-level operating system, and transmits the result to the second application.

27. The non-transitory computer-readable medium of claim 26, wherein the contents comprise instructions executable by the electronic device.

* * * * *